(12) United States Patent
Ferri et al.

(10) Patent No.: US 11,314,208 B2
(45) Date of Patent: Apr. 26, 2022

(54) WATCH PROVIDED WITH A CONTROL MEMBER

(71) Applicant: The Swatch Group Research and Development Ltd, Marin (CH)

(72) Inventors: Yvan Ferri, Lausanne (CH); Pierpasquale Tortora, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 17/077,047

(22) Filed: Oct. 22, 2020

(65) Prior Publication Data
US 2021/0173353 A1 Jun. 10, 2021

(30) Foreign Application Priority Data

Dec. 10, 2019 (EP) .................................... 19214819

(51) Int. Cl.
*G04G 21/08* (2010.01)
*G06F 3/0488* (2013.01)
*G06F 3/0482* (2013.01)
*G06F 3/04883* (2022.01)

(52) U.S. Cl.
CPC ........... *G04G 21/08* (2013.01); *G06F 3/0482* (2013.01); *G06F 3/04883* (2013.01)

(58) Field of Classification Search
CPC .................................................. G04G 21/08
See application file for complete search history.

(56) References Cited

U.S. PATENT DOCUMENTS

| | | |
|---|---|---|
| 10,203,662 B1 | 2/2019 | Lin et al. |
| 2002/0130835 A1 | 9/2002 | Brosnan |
| 2016/0109861 A1 | 4/2016 | Kim et al. |
| 2017/0090599 A1* | 3/2017 | Kuboyama ......... G06F 3/03547 |

(Continued)

FOREIGN PATENT DOCUMENTS

| | | |
|---|---|---|
| JP | 2006-185405 | 7/2006 |
| JP | 2016-115310 A | 6/2016 |

(Continued)

OTHER PUBLICATIONS

European Search Report dated Apr. 30, 2020 in European Application 19214819.5 filed Dec. 10, 2019 (with English Translation of Categories of Cited Documents & Written Opinion), 5 pages.

(Continued)

*Primary Examiner* — Nhat Huy T Nguyen
(74) *Attorney, Agent, or Firm* — Oblon, McClelland, Maier & Neustadt, L.L.P.

(57) ABSTRACT

A watch includes a control member which makes it possible to manage one or more electronic functions. The control member includes an optical guide, which extends between a proximal face and a distal face with respect to the middle. A light source is arranged such that it can illuminate the distal face through the optical guide, and an imaging device, including a photodetector, is arranged to capture an image of a portion of the finger of a user of the watch, when they touch the distal face. A processor generates commands based on signals generated by the photodetector, in the way of an optical mouse, for example, to make it possible for the user to browse in a menu displayed on a digital screen.

11 Claims, 4 Drawing Sheets

(56) References Cited

U.S. PATENT DOCUMENTS

| | | |
|---|---|---|
| 2017/0192391 A1 | 7/2017 | Ely et al. |
| 2018/0103730 A1 | 4/2018 | Fostinis et al. |
| 2019/0072912 A1 | 3/2019 | Pandya et al. |
| 2019/0101870 A1 | 4/2019 | Pandya et al. |
| 2020/0041962 A1* | 2/2020 | Beyhs .................. G04G 9/007 |

FOREIGN PATENT DOCUMENTS

| | | |
|---|---|---|
| WO | WO 2014/200766 A1 | 12/2014 |
| WO | WO 2019/050778 A1 | 3/2019 |

OTHER PUBLICATIONS

Chinese Office Action issued in Chinese Patent Application No. 202011432827.1 dated Nov. 17, 2021.
Japanese Office Action issued in Japanese Patent Application No. 2020-186965 dated Nov. 9, 2021 (w/ English translation).

\* cited by examiner

WATCH PROVIDED WITH A CONTROL MEMBER

CROSS-REFERENCE TO RELATED APPLICATION

This application claims priority to European Patent Application No. 19214819.5 filed on Dec. 10, 2019, the entire disclosure of which is hereby incorporated herein by reference.

TECHNICAL FIELD

The invention relates to a watch provided with at least one electronically manageable function and with a control member for controlling this function.

TECHNOLOGICAL BACKGROUND

Mechanical or electromechanical watches standardly comprise a crown and stem which makes it possible to adjust the position of the hands by rotating the crown, as well as winding the spring barrel in the case of a mechanical watch. In most cases, the crown is located in an idle position close to the case of the watch, and it must be pulled towards an adjustment position to adjust the time and, if necessary, the date.

More and more additional features are provided, such as an electronic display of personal and/or geographic information, for example a calendar, fitness and geolocation data. This is the case also for watches equipped with a mechanical movement, for example by adding an electronic module comprising a digital screen arranged on a portion of the dial.

The presence of the abovementioned additional features generally requires specific control means, which makes it possible, for example, to select a function, to browse in a menu, etc.

Electronic watches have been developed with a 'joystick' or 'trackball' type control member. Examples of these solutions are respectively illustrated by documents EP 1168113 and EP 0582150. But, it will be noted that these solutions are not provided for a watch with a mechanical winding. Document EP 0582150 also describes a watch provided with a crown and stem, as well as a 'trackball' device. The disadvantage of the latter solution is that the presence of two control members separated spatially is not always desirable from an aesthetic standpoint and/or an economic standpoint given that the watch case is more complex to machine. It will also be noted that a good sealing of the watch case is more difficult to obtain with 'joystick'- or 'trackball'-type control members described in the abovementioned prior documents. In addition, the current embodiments of this type of control member comprise mobile elements, which makes the mechanical construction more complex.

SUMMARY OF THE INVENTION

The invention aims to produce a watch which does not suffer the disadvantages described above. This aim is achieved by the watch according to the appended claims.

A watch according to the invention comprises a case, which includes a middle, an horological movement inside the middle, and a control member defining a central axis and mounted laterally with respect to the middle, the watch being provided with at least one electronic feature. The control member includes an optical guide comprising a proximal face close to the middle and a distal face distant from the middle, said optical guide making it possible for the transmission of optical signals between the distal face thereof and the proximal face thereof, the distal face being arranged such that a user can touch it with their finger. The watch is provided with at least one light source capable of illuminating at least one portion of the distal face through the optical guide. The watch is provided with an imaging device comprising a photodetector, in particular a light matrix sensor, and arranged to be able to produce, when the light source is active, an image of a portion of a finger of a user which is located at the level of the distal face of the optical guide in a spatially determined detection zone and relatively fixed to the middle. The watch further includes a processor configured to be able to receive from the photodetector a plurality of successive digital images of portions of said finger, which are located successively in said detection zone, to be able to process this plurality of digital images so as to detect a movement of said finger relative to said detection zone, and to be able to generate a command which manages said electronic feature of the watch based on said movement of the finger.

According to a particular embodiment, the light source and the imaging device are incorporated in the side wall of the middle of the watch. According to another embodiment, the light source and the photodetector are arranged on one same PCB which is introduced in the side wall of the middle or arranged against an inner surface of this side wall.

According to preferred embodiments, the control member fulfils at least one first function managed by a rotation or an axial movement of this control member, and the electronic function managed by way of the light source and of the imaging device is added to this first function.

The control member of a watch according to the invention does not comprise any mobile elements to implement the electronic function; which simplifies the mechanical construction of the control member.

BRIEF DESCRIPTION OF THE FIGURES

The invention will be described below in a more detailed manner using the appended drawings, given as not-at-all limiting examples, wherein.

DETAILED DESCRIPTION OF AN EMBODIMENT OF THE INVENTION

The invention is also applied just as well to watches equipped with a mechanical movement, as it is to an electromechanical movement. It can even be applied to an electronic watch with no hands.

In the case of a mechanical movement, the watch is provided with additional features with an electronic character. This watch can include a digital screen which extends over a portion of the dial, provided to display the time by hands, and on which are displayed various data, such as the date, the time, alphanumeric messages or other information which are accessible for example by browsing in one or more menus. The watch comprises a crown stem mechanism for winding and adjusting hands, well-known in the state of the art.

Figure 1:
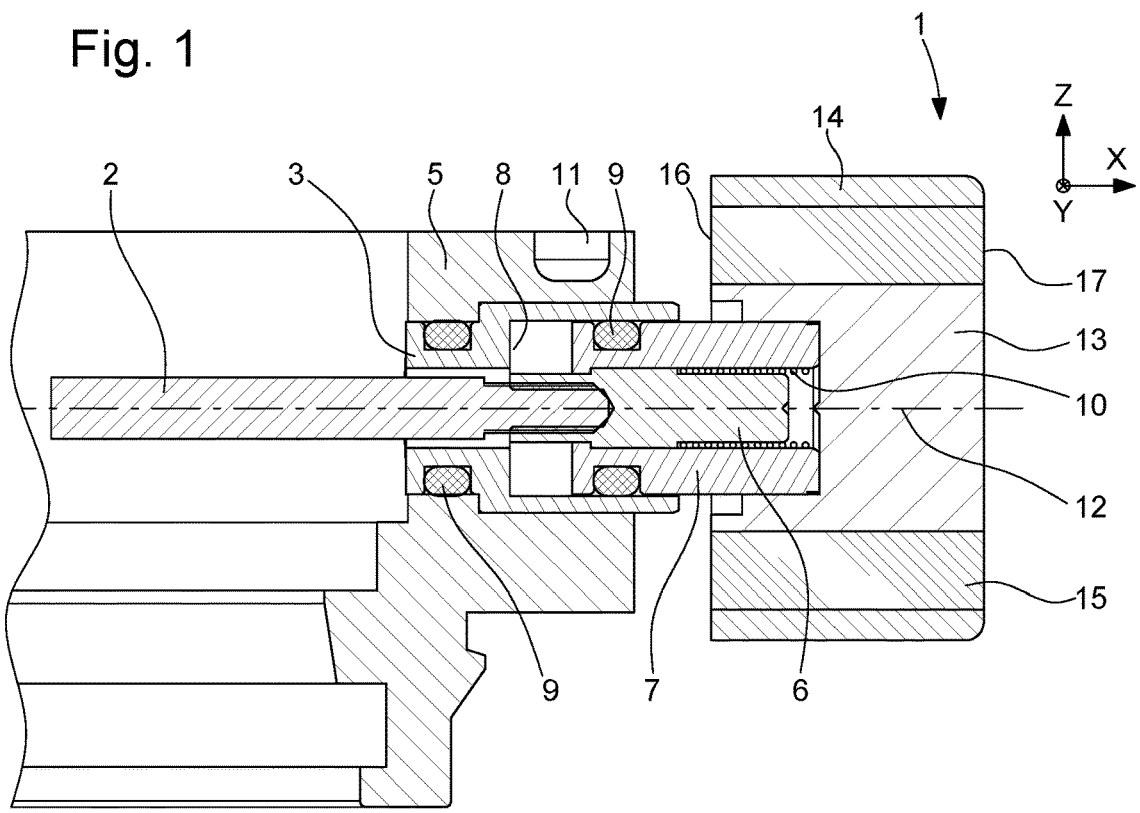
FIG. 1 shows a vertical cross-section of the crown stem mechanism in a watch according to an embodiment of the invention.
Figure 2:
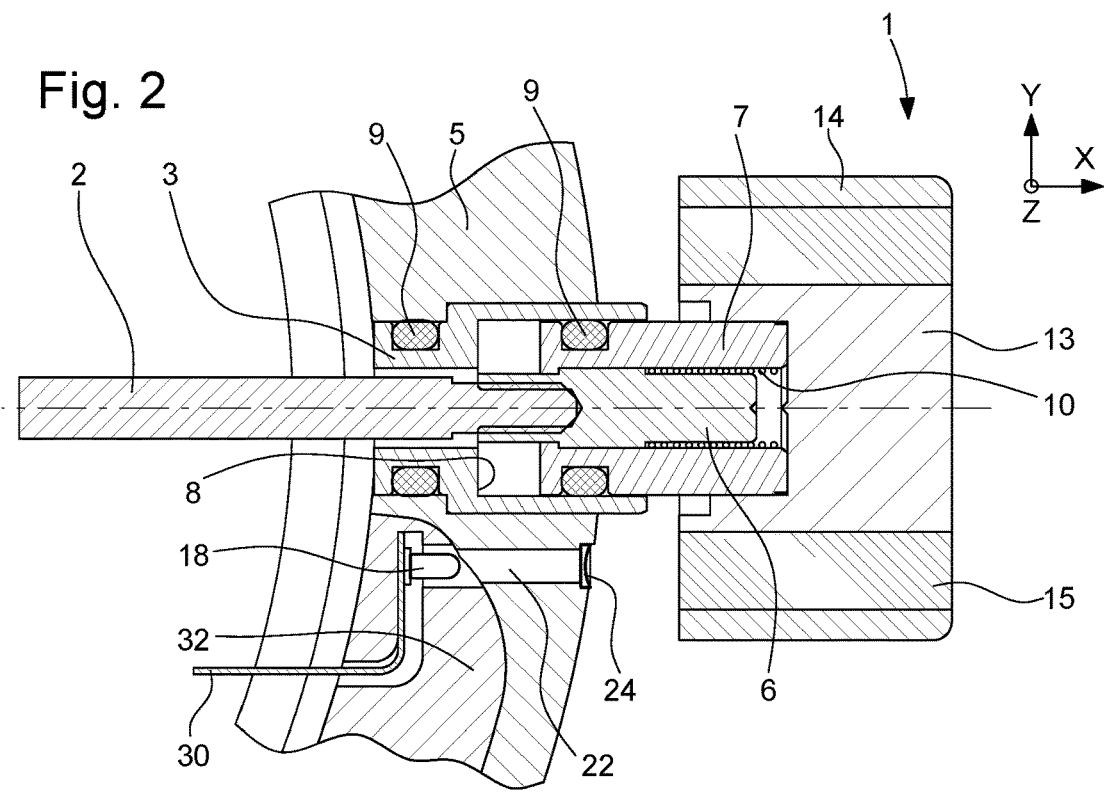
FIG. 2 shows a horizontal cross-section of the same mechanism as FIG. 1.
Figure 3:
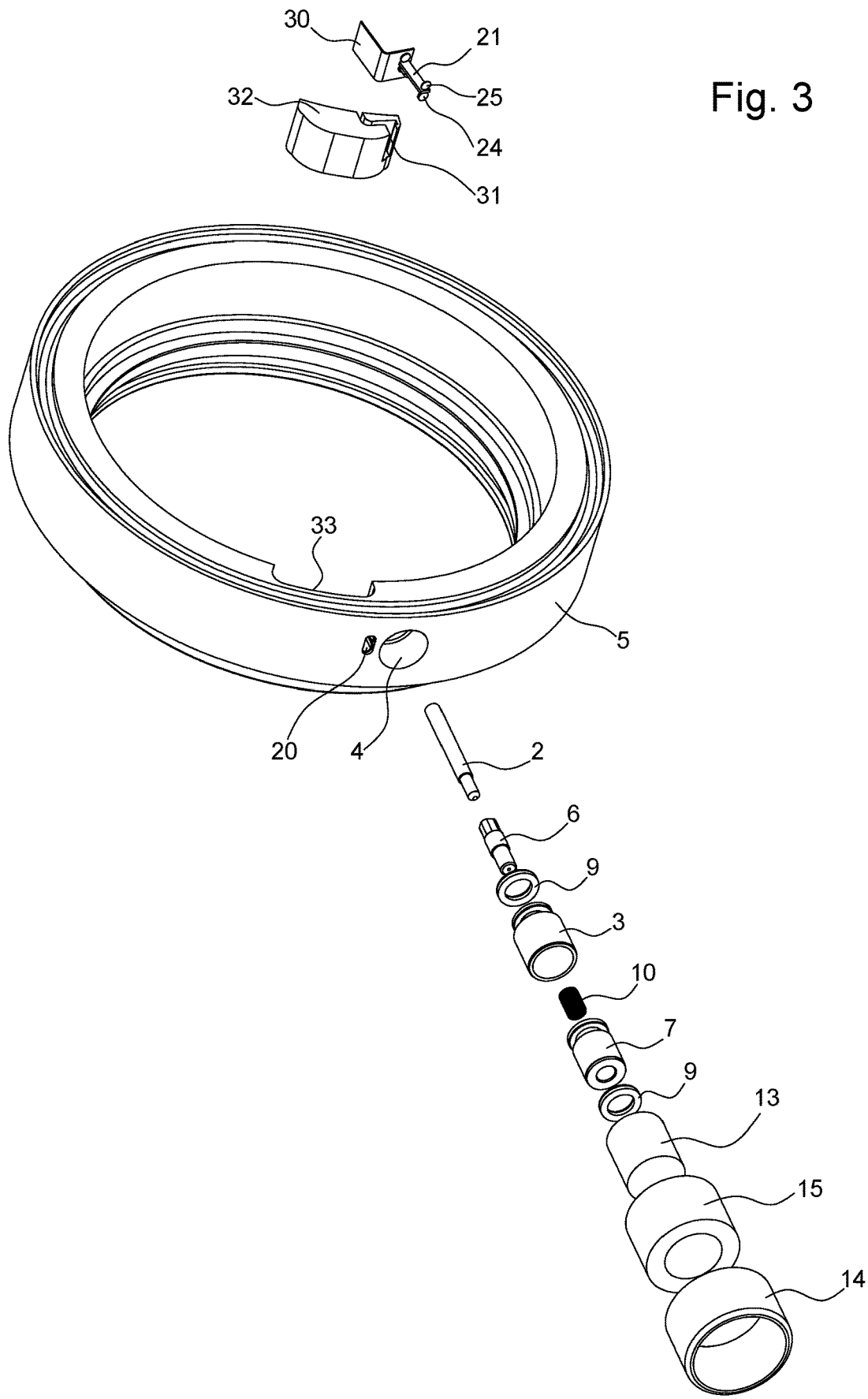
FIG. 3 shows an exploded view of the components of the mechanism of FIGS. 1 and 2.

FIGS. 1 and 2 show vertical and horizontal cross-sections of the crown stem mechanism of a watch according to an embodiment of the invention. In FIG. 3, the different components are viewed in an exploded view. In a known manner, the gear 1 is connected to a winding stem 2 by way of a stem connector 6 repelled over an end of the stem 2. All of the stem 2 and of the stem connector 6 passes through a tube 3 fixedly mounted in a hole 4 machined in the wall of the middle 5 of the watch. In the finished watch case, the middle 5 forms the support wherein an horological movement which is adjustable by the crown stem mechanism is installed. The middle 5 is provided with a circular groove 11 on the upper surface thereof, to receive the glass of the watch. The crown 1 can rotate around the central axis 12 thereof which is coaxial with the central axis of the stem 2.

The rotating crown 1 is only one embodiment of a control member mounted laterally with respect to the middle and to which the invention is applicable. Another example of such a control member is the head (generally non-rotating) of a pushbutton of a chronographic watch. The invention will be described for the case of the rotating crown, which represents the most common case in the watchmaking field, but which limits the scope of the invention.

In the embodiment shown in the figures, the rotating crown 1 is connected to the stem connector 6 by a spring pushbutton mechanism which makes it possible for a self-reversible axial alignment of the crown with respect to the middle 5. This type of mechanism is known in itself and does not form a limitation of the scope of the invention. The crown is fixed on a tubular element 7 which can be moved axially with respect to the stem connector 6, this being housed inside the tubular element. The stem connector and the element 7 are provided with corresponding profiles making it possible for the rotation of the stem 2 by the crown 1. As shown in FIG. 2, the thrust of the crown, exerted manually by the user of the watch, actuates the axial movement of the element 7 until the latter comes into contact with a vertical wall 8 of the tube 3. O-rings 9 made from compressible material between the tube 3 and the middle 5 and between the element 7 and the tube 3 ensure the sealing of the mechanism. A spring 10 is mounted between a stop provided on the stem connector 6 and an inner surface of the crown 1, such that the thrust of the crown compresses the spring, which pushes the crown back towards the initial position thereof as soon as the pressure exerted on the crown is released. The extended position shown in the figures is therefore the idle position of the crown 1.

In a manner known per se, this position makes it possible, for example, for the user to wind their watch manually by rotating the crown 1. According to the embodiments, and also in a known manner, the crown can be moved away from the middle 5, by manually pulling the crown and rotating the stem 2 in the axial direction, to activate mechanical adjustment modes such as the adjustment of the position of the hands. Different systems exist which adjust the axial positioning of the crown 1 and the actuation of the mechanical adjustment, and the invention is applicable in combination with any one of these systems. Independently from the applied system, the invention is relative to the functions applied to the crown 1, at least when this is located in the idle position.

Figure 4:
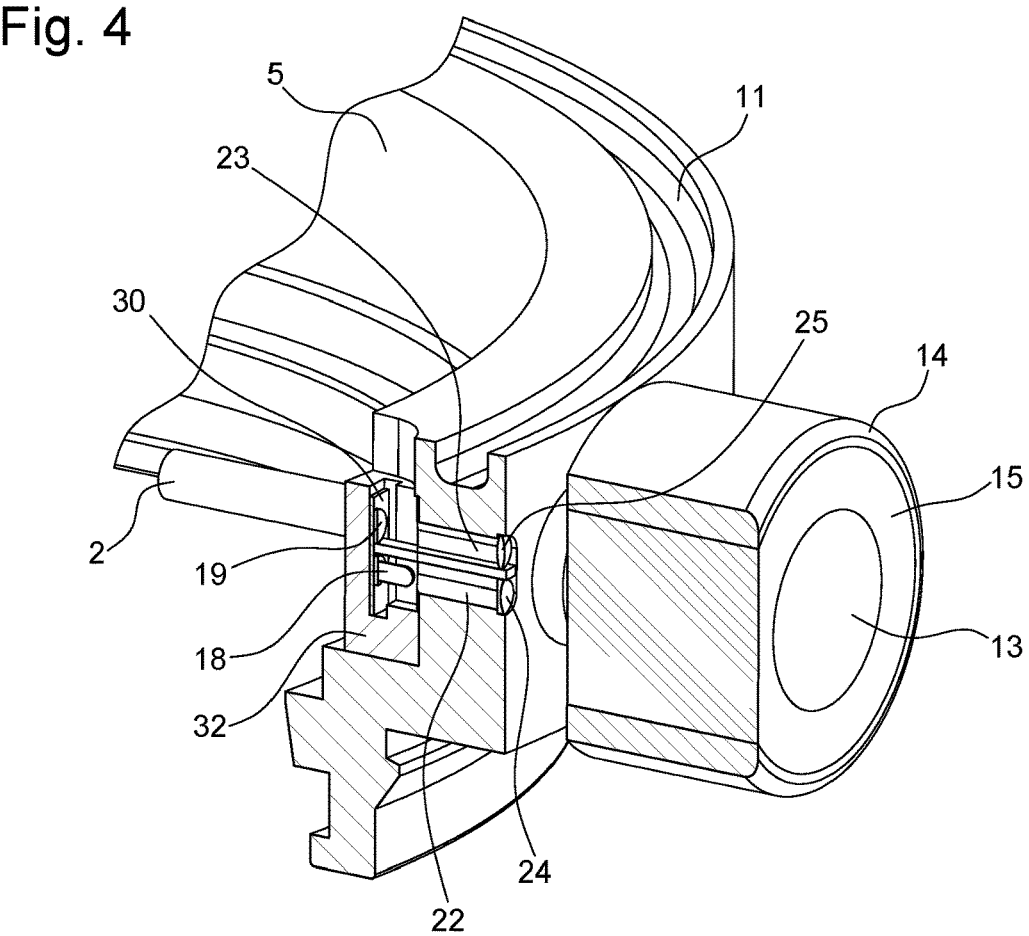
FIGS. 4 and 5 show 3D cross-sections which show the positions of the light source and of the photodetector in the watch of FIGS. 1 to 3.
Figure 5:
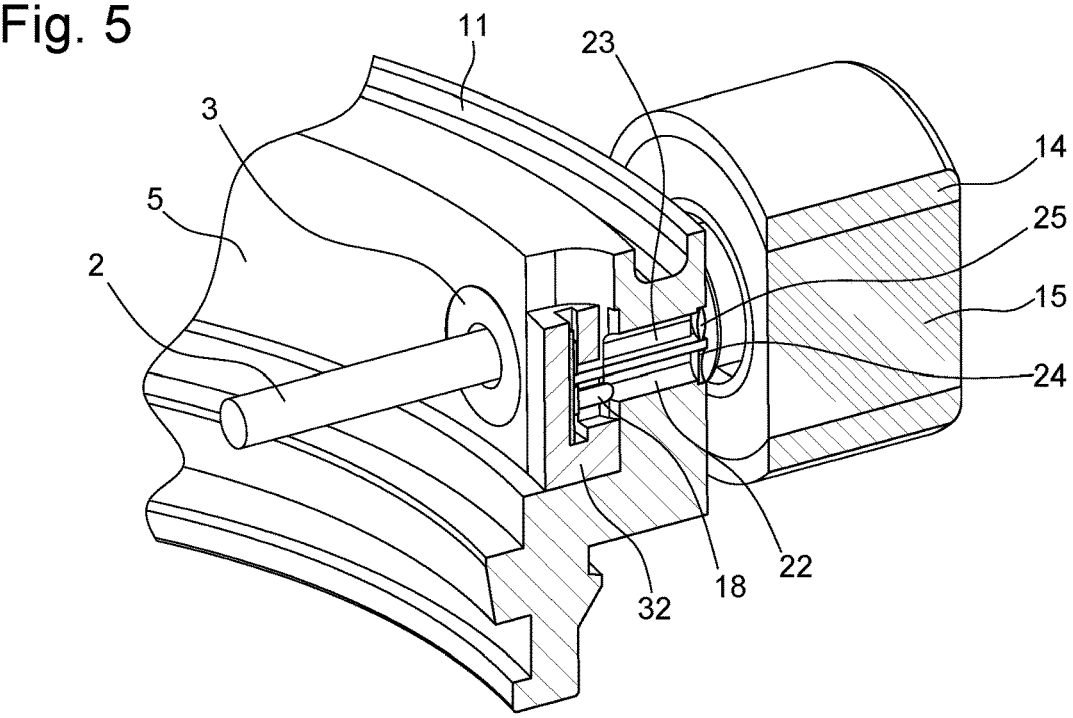

According to the embodiment shown, the crown 1 comprises a toroidal optical guide 15 incorporated in the crown and arranged coaxially with respect to the central axis 12. According to the embodiment shown, the optical guide 15 is fixed between a cylinder 13 and a ring 14, made from opaque material, the assembly of these three parts forming the crown 1. The optical guide 15 comprises a proximal face 16 which is close to the middle 5 and a distal face 17 distant from the middle 5. The optical guide is manufactured from a transparent, potentially coloured material. The watch is provided with a light source 18, for example of the LED (Light Emitting Diode) type, and with a photodetector, both mounted on the face of the optical guide 15. In the embodiment shown, the LED 18 and the photodetector 19 are incorporated in the middle 5, the LED 18 being mounted below the photodetector 19. The middle 5 comprises an opening 20 in the side wall thereof, an upper portion of the opening being arranged opposite the photodetector, and a lower portion of the opening being arranged opposite the LED 18, with an opaque separator 21 between the two portions, which also separates the LED 18 from the photodetector, thus creating two separate optical channels 22 and 23 (see FIGS. 4 and 5), respectively opposite the LED and the photodetector. On the other side of the channels with respect to the LED and the photodetector, two lenses 24 and 25 are arranged.

The photodetector 19 is preferably a light matrix sensor which comprises a pixel matrix generating electric currents which are representative of the image captured. This type of photodetector is known per se.

The photographic sensor 19 as well as the LED 18 are mounted on a printed circuit board (PCB) 30, also including the components necessary (not shown) for controlling the LED and the photodetector and for processing the signals obtained. According to the embodiment shown, the PCB 30 is made in a right-angle form, and the separator 21 with the lenses 24 and 25 is fixed to the PCB 30, projecting from the surface of the PCB. This assembly is inserted in a recess 31 machined in an auxiliary part 32, which is itself fixed in a cavity 33, machined inside the wall of the middle 5, and which covers the opening 20. This embodiment only represents an embodiment of the incorporation of the light source 18 and of the photodetector 19 in the middle, and other embodiments are possible.

Figure 6:
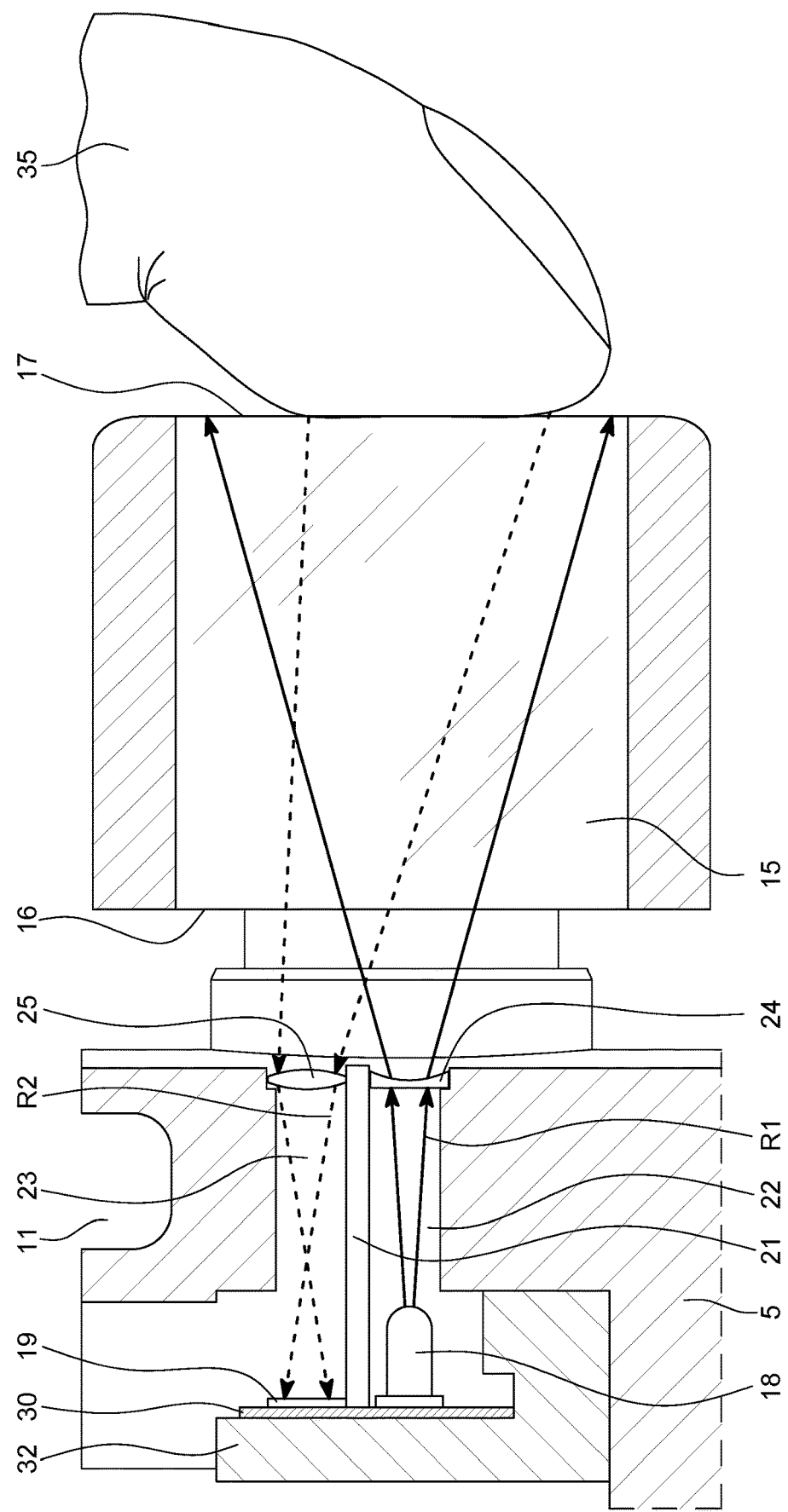
FIG. 6 clarifies the function of the lenses in combination with the light source and the photodetector.

The positions and the functionalities of the lenses 24 and 25 are clarified by FIG. 6. The lower lens 24 is a concave lens positioned such that the LED 18 is located in the focal background of the lens 24, with the aim of enlarging to the maximum the beams R1 generated by the LED and passing through the first channel 22, and of thus illuminating a detection zone on the distal face 17 of the optical guide 15, through this optical guide. The detection zone is spatially determined by the portion of the distal face 17 illuminated by the projections, generated by the lens 24, of the beams R1 produced by the LED. The detection zone is fixed with respect to the middle 5 since the crown 1 is mainly immobile in the radial direction with respect to the central axis 12. Thanks to the toroidal form of the optical guide 15, the form and the dimensions of the detection zone are maintained fixed with respect to the middle 5, independently of the angular position of the crown 1.

The assembly of the convex lens 25 and of the photodetector 19 forms an imaging device, of which the photodetector 19 is arranged to be able to produce, when the light source 18 is active, an image of a portion of the finger 35 located in the detection zone. The image is projected on the sensor 19 by the beams R2 passing through the second channel 23, when the user touches with their finger, the distal face 17 of the optical guide 15.

In addition, the photodetector 19 is arranged so as to be able to generate a plurality of digital images of portions of said finger located successively in said detection zone. In other words, the photodetector 19 generates a succession of digital images of the fingerprint of the user, when they touch the distal face 17 of the optical guide 15 illuminated by the light source 18. When the user moves their finger while remaining in contact with the distal face 17, the analysis of the differences between the successive images makes it possible to determine the movements of the fingerprint in terms of size and speed of these movements. When the sampling of the signals is sufficiently rapid, the captured images make it possible to follow the movements of the finger in real time and to translate these signals into commands for managing electronic features of the watch. This functioning is similar to a computer mouse, with the difference that the light source is now static with respect to the pattern of the surface which is detected (namely, the fingerprint), this pattern itself being mobile. Like the algorithms used for the functioning, computer mice detect a relative movement between the photodetector and the pattern of the surface on which the optical mouse is moved, these algorithms are applicable to the detection of the movement of a fingerprint on the control member in a watch according to the invention.

A processor (not shown) is on board on the PCB 30 for processing the signals generated by the photodetector and to translate them into commands which will manage one or more electronic features of the watch, for example the controlling of a cursor on a two-dimensional digital screen. As indicated above, well-known methods and algorithms of the field of IT can be implemented, for the processing of signals, as well as for the generation of commands.

A battery or other source of electric energy, such as a photovoltaic cell, is present in the watch for supplying the components mounted on the PCB 30 and/or other electronic components implemented in the watch.

It is seen in figures that the LED 18 is positioned at the same height as the central axis 12. This positioning makes it possible for the illumination of a detection zone which extends symmetrically with respect to the horizontal plane which contains the axis 12. Other ways of positioning the light source 18 and the photodetector 19 are possible.

Preferably, if the control member is made by way of a spring pushbutton, as is the case for the embodiment shown, the watch comprises a proximity detector (not shown) which is configured to detect the thrust of the control member 1, actuated by the user against the force of the spring 10, and to generate an electric signal according to this detection, such that the processor generates in response, a specific command. The commands generated by the thrust of the crown 1 can be, for example, commands for confirming a selection from among the options presented in a menu. The reversible thrust can be used, also to activate and then deactivate the 'optical mouse' feature. In a variant, the duration of the thrust can determine the command; for example, a longer duration for the activation or deactivation of the 'optical mouse' feature and a shorter duration to confirm a selection as soon as the feature is active.

Different types of proximity detector can be used to fulfil the functions described in the preceding paragraph, such as a magnetic detector with variable reluctance. Alternatively, a capacitive detector can be provided, made by the integration of two plates of a condenser arranged respectively in the tube 3 and in the element 7.

It must be noted that the invention is not limited to control members which have a function designated and linked to the rotation or the axial movement of the control member. The invention also covers a control member which is not rotative nor movable in the axial direction. In this particular case, the control member is firstly dedicated to the 'optical mouse' function according to the invention.

The toroidal and coaxial form with the central axis 12 of the optical guide 15 is particularly useful for the rotating control members, since the features, which can be actuated by way of the finger of the user, are available independently from the rotating position of the control member. For non-rotating control members, alternative forms of the optical guide are possible.

The invention claimed is:

1. A watch comprising a case, which includes a middle, an horological movement inside the middle, and a control member defining a central axis and mounted laterally with respect to the middle, the watch being provided with at least one electronic feature; wherein:

the control member includes an optical guide comprising a proximal face close to the middle and a distal face distant from the middle, said optical guide making it possible for the transmission of optical signals between the distal face thereof and the proximal face thereof, the distal face being arranged such that a user can touch it with their finger, the watch is provided with at least one light source capable of illuminating at least one portion of the distal face through the optical guide, the watch is provided with an imaging device comprising a photodetector and arranged to be able to produce, when the light source is active, an image of a portion of a finger of a user which is located at the level of the distal face of the optical guide in a detection zone, spatially determined and fixed relative to the middle, the watch includes a processor configured to be able to receive from the photodetector, a plurality of successive digital images of portions of said finger which are located successively in said detection zone, to be able to process this plurality of digital images so as to detect a movement of said finger relative to said detection zone, and to be able to generate a command which manages said electronic feature of the watch based on said movement of the finger, and wherein the light source and the photodetector are incorporated in or against an inner surface of a side wall of the middle, the middle includes a first optical channel and a second optical channel, which are positioned respectively opposite the light source and the photodetector, the first optical channel and the second optical channel are separated by an opaque separator.

2. The watch according to claim 1, wherein the optical guide is a toroidal coaxial part with the central axis.

3. The watch according to claim 2, wherein the optical guide has the form of a tube which is fixed between a cylinder and a ring manufactured from an opaque material and forming, with the optical guide, the control member.

4. The watch according to claim 1, wherein the first optical channel and the second optical channel are provided respectively with a first lens and a second lens arranged such that:

the first lens extends the light beams generated by the source, so as to illuminate said detection zone, and the second lens, forming the imaging device, being arranged to project said image on the photodetector.

5. The watch according to claim 4, wherein:
the source and the photodetector are mounted on one same PCB,
the separator is fixed to the PCB and is raised from a surface of the PCB,
the lenses are fixed to the separator.

6. The watch according to claim 1, wherein the control member is a rotating crown, capable of rotating an extended element about the central axis user rotates the crown to carry out a first function other than the one of said electronic feature.

7. The watch according to claim 1, wherein the control member is a head of a pushbutton having, as a first function, an activation of a feature of a chronograph equipping the watch, this first function being other than the one of said electronic function.

8. The watch according to claim 1, wherein the control member is capable of undergoing an axial and self-reversible alignment with respect to the middle; in that the watch comprises at least one detector arranged so as to be able to detect said axial alignment; and wherein said processor is configured to generate, in response to said axial alignment, a specific command.

9. The watch according to claim 8, wherein the specific command generated by the detection of said axial alignment is the activation or the deactivation of the light source and of the photodetector.

10. The watch according to claim 8, wherein a command generated by the detection of said axial alignment is the confirmation of a selection.

11. The watch according to claim 1, wherein the horological movement is of the mechanical type.

* * * * *